United States Patent
Vigderovich et al.

(10) Patent No.: US 11,188,440 B2
(45) Date of Patent: Nov. 30, 2021

(54) MONITORING TASK OUTPUT WITHIN A SYSTEM

(71) Applicant: International Business Machines Corporation, Armonk, NY (US)

(72) Inventors: Max Vigderovich, Tel Aviv (IL); Yan Lindvor, Quriyat-Motzkin (IL); Dan Ravid, Tel Aviv (IL); Nadav Parag, Rehovot (IL); Assaf Goren, Mazkeret Batya (IL)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 16/144,860

(22) Filed: Sep. 27, 2018

(65) Prior Publication Data
US 2020/0104231 A1    Apr. 2, 2020

(51) Int. Cl.
| | | |
|---|---|---|
| G06F 11/34 | (2006.01) | |
| G06F 11/26 | (2006.01) | |
| G06F 11/07 | (2006.01) | |
| G06F 8/65 | (2018.01) | |
| G06F 9/48 | (2006.01) | |

(52) U.S. Cl.
CPC ............ *G06F 11/3457* (2013.01); *G06F 8/65* (2013.01); *G06F 9/4881* (2013.01); *G06F 11/0772* (2013.01); *G06F 11/261* (2013.01); *G06F 2201/835* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 4,228,537 | A * | 10/1980 | Henckels | G06F 11/261 714/33 |
| 5,455,929 | A * | 10/1995 | Bosshart | G06F 11/3476 703/15 |
| 8,306,926 | B2 | 11/2012 | Prahlad et al. | |
| 9,053,264 | B2 | 6/2015 | Yen et al. | |
| 9,798,596 | B2 | 10/2017 | Vibhor et al. | |
| 2014/0074452 | A1* | 3/2014 | Carmi | G06F 11/3089 703/22 |
| 2015/0309813 | A1 | 10/2015 | Patel | |
| 2016/0306977 | A1* | 10/2016 | Zarakas | H04L 63/123 |

(Continued)

FOREIGN PATENT DOCUMENTS

EP    3168748 A1    5/2017

OTHER PUBLICATIONS

Handzel et al., "A Simulation Approach to Statistical Evaluation of Periodic Task Scheduling in a Real-Time Computer System," Methods and Models in Automation and Robotics (MMAR), 2010, 15th International Conference, pp. 271-274.

(Continued)

*Primary Examiner* — Craig C Dorais
(74) *Attorney, Agent, or Firm* — Zilka-Kotab, P.C.

(57) ABSTRACT

A computer-implemented method according to one embodiment includes simulating, for a predetermined time period, output of a first task that periodically runs within a system to create a simulated output, comparing the simulated output to actual output of the first task for the predetermined time period, and generating an alert in response to determining that the simulated output does not match the actual output for the predetermined time period.

18 Claims, 5 Drawing Sheets

(56) References Cited

U.S. PATENT DOCUMENTS

2017/0359273 A1    12/2017  Dubey et al.
2019/0235923 A1*  8/2019  Collins ................ G06F 9/5011

OTHER PUBLICATIONS

Jones, M. T., "Linux Scheduler simulation," IBM Developer, Feb. 23, 2011, 16 pages, retrieved from https://www.ibm.com/developerworks/library/l-linux-scheduler-simulator/index.html.

* cited by examiner

MONITORING TASK OUTPUT WITHIN A SYSTEM

BACKGROUND

The present invention relates to recurring tasks within a system, and more specifically, this invention relates to monitoring recurring tasks and determining errors associated with the recurring tasks.

Recurring tasks are commonly implemented within systems in order to perform one or more actions (e.g., creating snapshots for backup purposes, etc.). However, if a recurring task fails, a user is currently unaware of details of the failure, how to fix the failure, or what a current state of the recurring task should be if the recurring task did not fail.

SUMMARY

A computer-implemented method according to one embodiment includes simulating, for a predetermined time period, output of a first task that periodically runs within a system to create a simulated output, comparing the simulated output to actual output of the first task for the predetermined time period, and generating an alert in response to determining that the simulated output does not match the actual output for the predetermined time period.

According to another embodiment, a computer program product for monitoring task output within a system includes a computer readable storage medium having program instructions embodied therewith, where the computer readable storage medium is not a transitory signal per se, and where the program instructions are executable by a processor to cause the processor to perform a method including simulating, for a predetermined time period, output of a first task that periodically runs within a system to create a simulated output, utilizing the processor, comparing, utilizing the processor, the simulated output to actual output of the first task for the predetermined time period, and generating an alert in response to determining that the simulated output does not match the actual output for the predetermined time period, utilizing the processor.

A system according to another embodiment includes a processor, and logic integrated with the processor, executable by the processor, or integrated with and executable by the processor, where the logic is configured to simulate, for a predetermined time period, output of a first task that periodically runs within a system to create a simulated output, compare the simulated output to actual output of the first task for the predetermined time period, and generate an alert in response to determining that the simulated output does not match the actual output for the predetermined time period.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for monitoring task output within a system. Various embodiments provide a method to simulate task output, compare the simulated output to actual task output, and generate an alert if the simulated output does not match the actual output.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for monitoring task output within a system.

In one general embodiment, a computer-implemented method includes simulating, for a predetermined time period, output of a first task that periodically runs within a system to create a simulated output, comparing the simulated output to actual output of the first task for the predetermined time period, and generating an alert in response to determining that the simulated output does not match the actual output for the predetermined time period.

In another general embodiment, a computer program product for monitoring task output within a system includes a computer readable storage medium having program instructions embodied therewith, where the computer readable storage medium is not a transitory signal per se, and where the program instructions are executable by a processor to cause the processor to perform a method including simulating, for a predetermined time period, output of a first task that periodically runs within a system to create a simulated output, utilizing the processor, comparing, utilizing the processor, the simulated output to actual output of the first task for the predetermined time period, and generating an alert in response to determining that the simulated output does not match the actual output for the predetermined time period, utilizing the processor.

In another general embodiment, a system includes a processor, and logic integrated with the processor, executable by the processor, or integrated with and executable by the processor, where the logic is configured to simulate, for a predetermined time period, output of a first task that periodically runs within a system to create a simulated output, compare the simulated output to actual output of the first task for the predetermined time period, and generate an alert in response to determining that the simulated output does not match the actual output for the predetermined time period.

Figure 1:
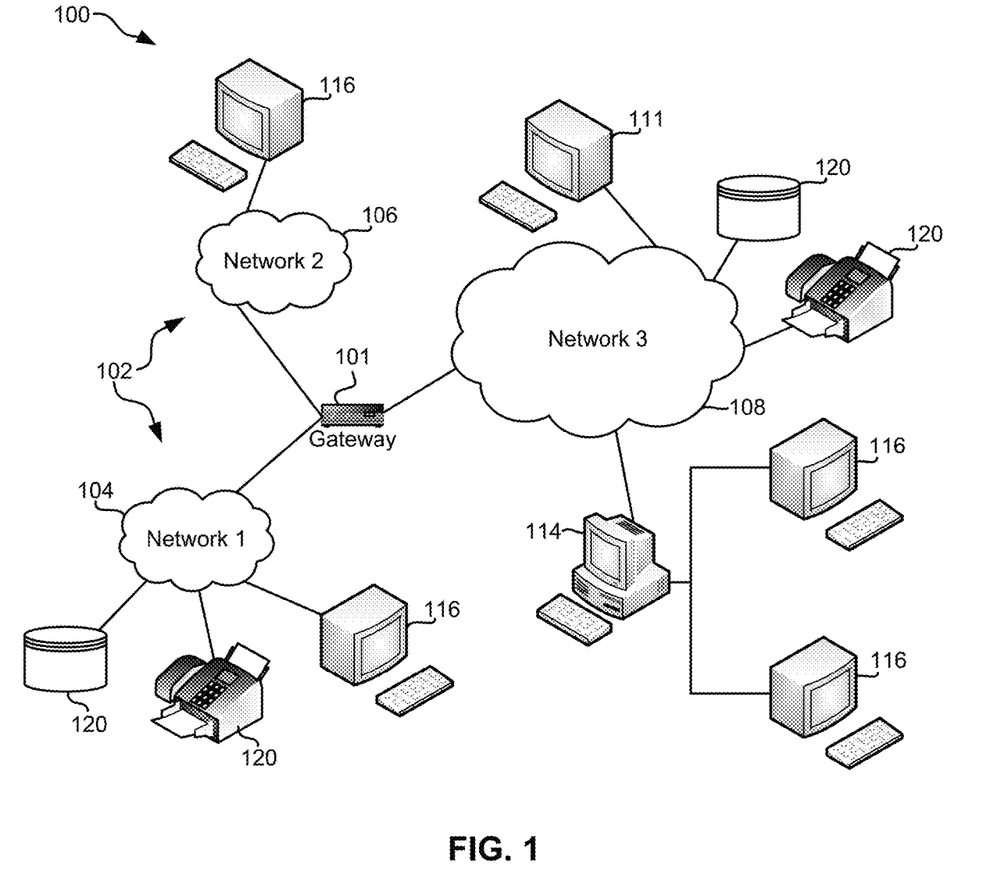
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
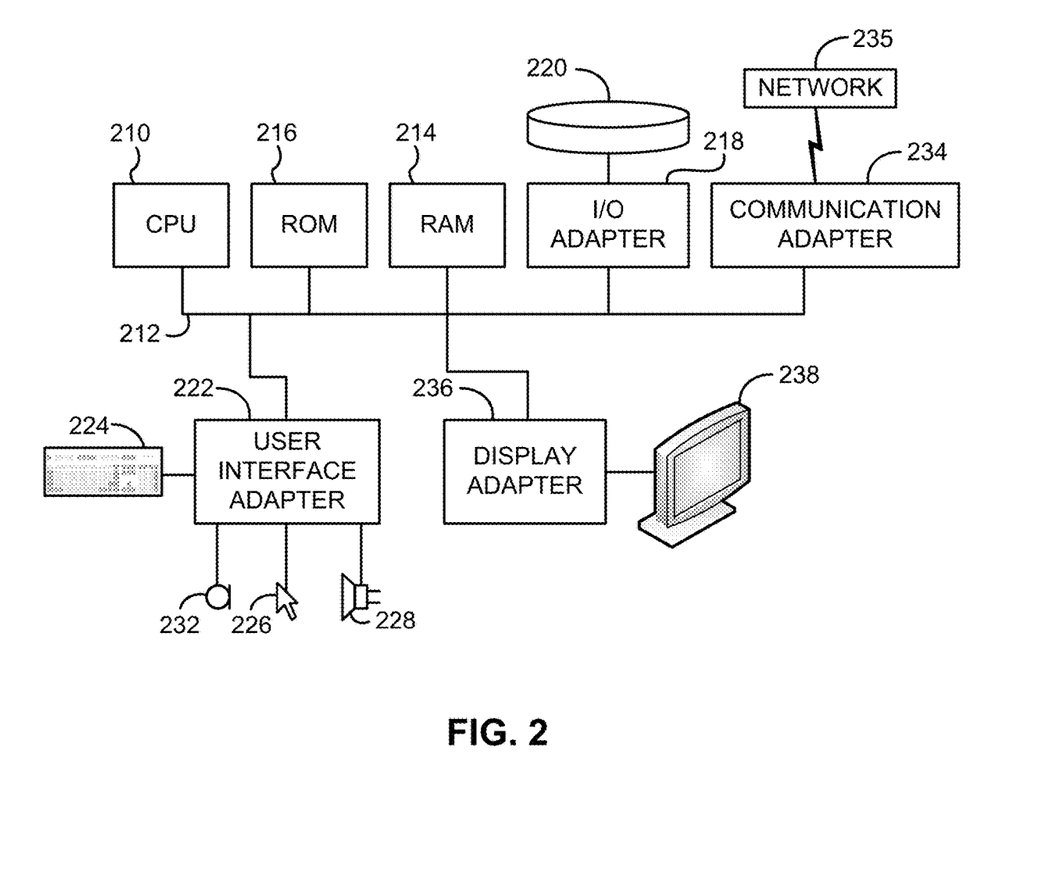
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
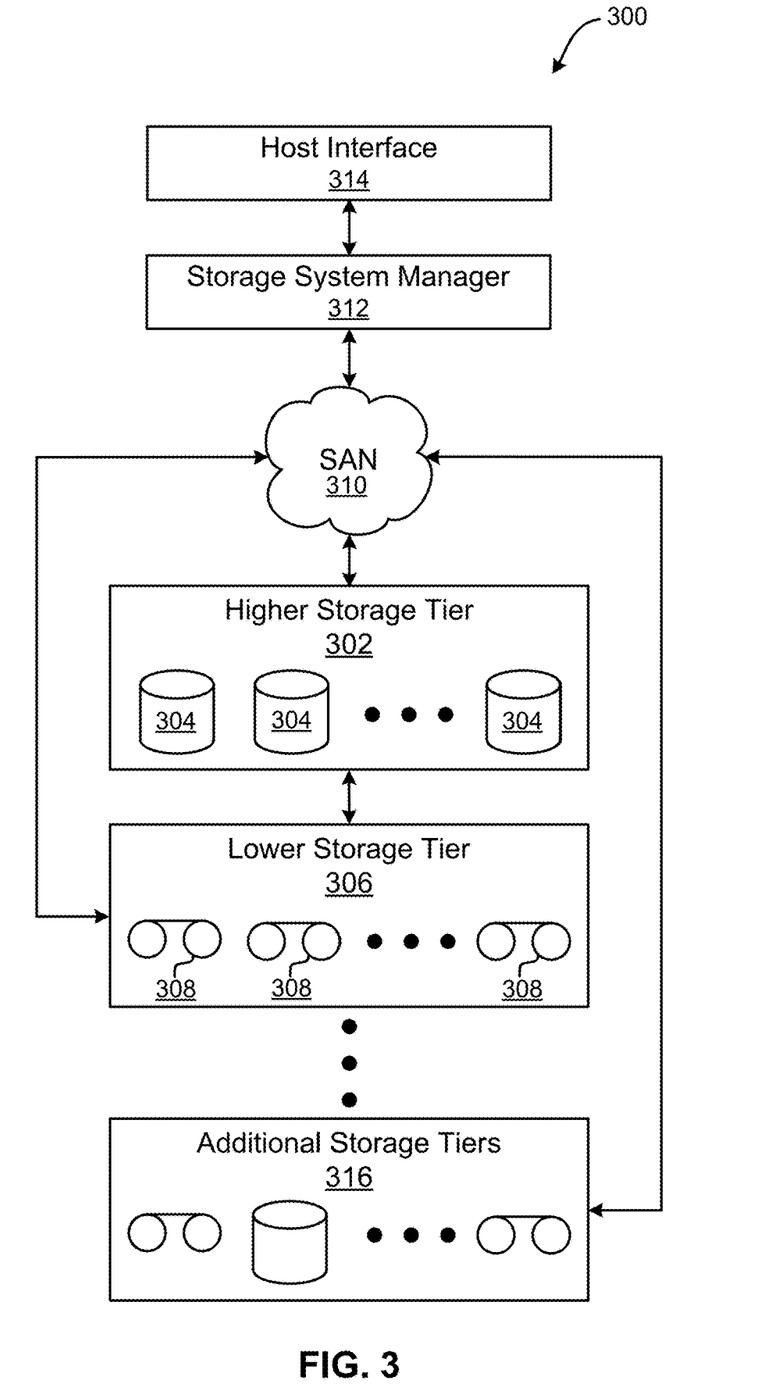
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
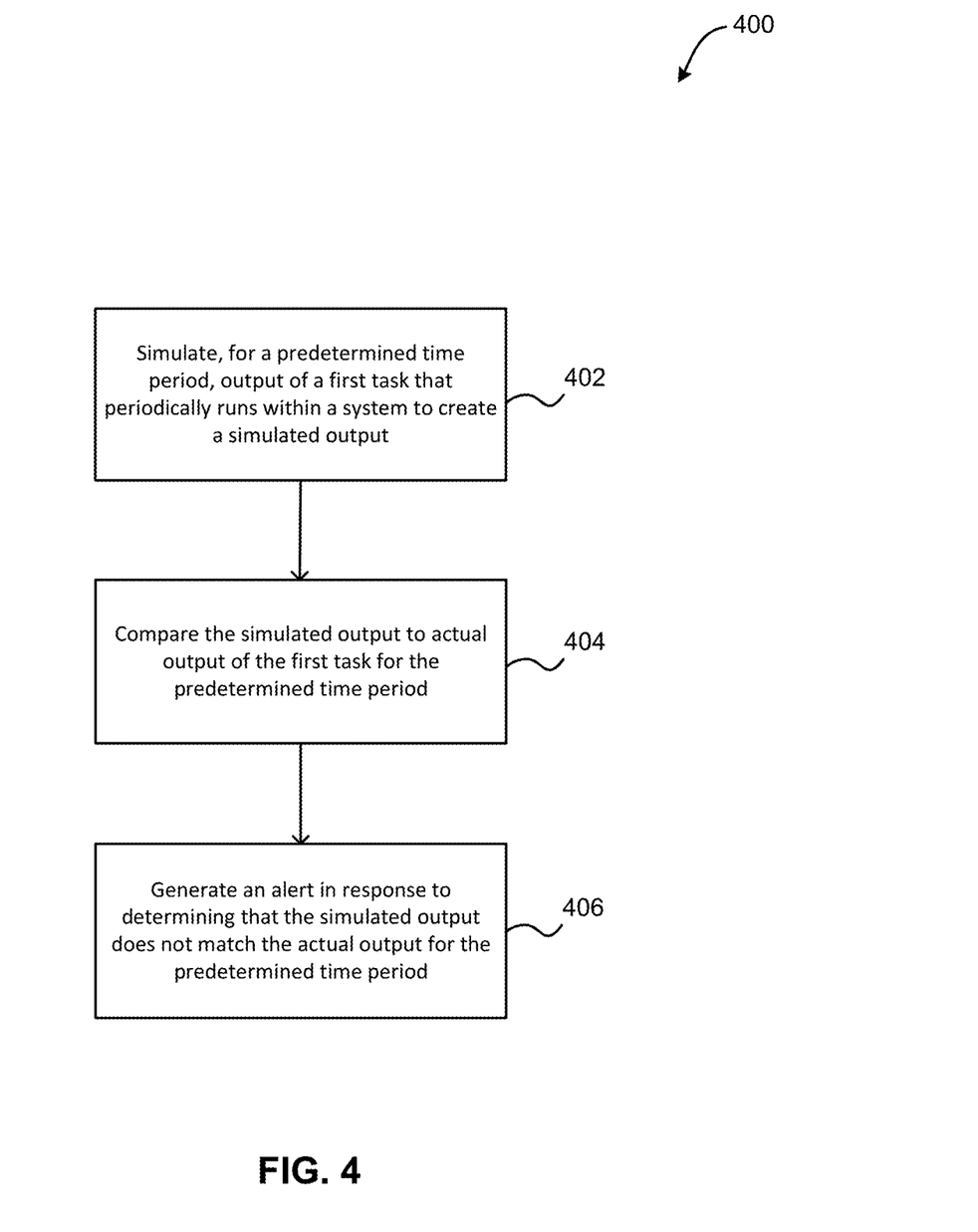
FIG. 4 illustrates a method for monitoring task output within a system, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where output of a first task that periodically runs within a system is simulated for a predetermined time period to create a simulated output. In one embodiment, the system may include a single computing device, or a plurality of computing devices. For example, the system may include a single node of a networked plurality of nodes. In another example, the system may include a cloud computing environment. In yet another example, the system may include a distributed storage environment. In still another example, the system may include a tiered storage environment.

Additionally, in one embodiment, the first task may include an application running within the system that analyzes data within the system and outputs resulting data, based on the analysis. In another embodiment, the first task may perform an analysis of data within the system, may perform maintenance of data within the system, may create a backup of data within the system, etc. In yet another embodiment, the first task may run according to a predetermined schedule. For example, the first task may run cyclically in response to a first schedule.

Further, in one embodiment, the first task may create a snapshot of data within the system. For example, the first task may include an application that analyzes data within the system and creates snapshot data, based on the analysis. The system may include one or more storage nodes of a distributed storage environment, and the first task may create a backup of data stored on the one or more storage nodes.

Further still, in one embodiment, the first task may store the snapshot at a location within the system. In another embodiment, the output may be simulated by a second task separate from the first task. In yet another embodiment, the second task may run according to a second schedule different from the first schedule. For example, a period of the second schedule may be longer than a period of the first schedule. In another example, the first task may be run daily, and the second task may be run weekly.

Also, in one embodiment, the second task may run in response to one or more criteria being met. For example, the second task may run in response to the creation of a predetermined number of instances of output (e.g., files, etc.) by the first task within the system. In another embodiment, the second task may analyze the first task in order to determine one or more details of the output of the first task.

For example, the second task may query the first task to obtain one or more parameters of the first task. The one or more parameters may be sent as metadata from the first task to the second task. The one or more parameters may include a naming scheme used by the first task to name its output, a location used by the first task to store its output, one or more size limitations followed by the first task when creating its output, a schedule by which the first task creates instances of output, etc.

In addition, in one embodiment, the second task may analyze historical output of the first task in order to determine the one or more details of the historical output of the first task. For example, the one or more details of the historical output of the first task may include a naming scheme used by the first task to name the output of the first task. For instance, the naming scheme may include a method by which the first task has named each of a plurality of historical instances of output by the first task.

In another example, the one or more details of the historical output of the first task may include a storage location used by the first task to store the output of the first task. For instance, the storage location may include a location used by the first task to store historical instances of output by the first task. In yet another example, the one or more details of the historical output of the first task may include a size of the historical output of the first task. For instance, the size may include an average size of a predetermined number of historical instances of output by the first task.

Furthermore, in one embodiment, the second task may simulate the output of the first task for the predetermined time period, based on the determined one or more details of the historical output of the first task. For example, the output may include a plurality of instances of output by the first task. In another example, the second task may determine a number of instances of output to simulate for the first task, based on a schedule by which the first task creates instances of output. For instance, the second task may determine a number of instances of output that should be created by the first task during the predetermined time period, based on a pattern derived from the schedule. The second task may also determine a specific date and time that each instance of output should be created by the first task during the predetermined time period, based on a pattern derived from the schedule.

Further still, in one example, for each of the determined number of instances of output to simulate for the first task, the second task may determine a timestamp for the instance of the simulated output, based on a pattern derived from the schedule by which the first task creates instances of output. In another example, for each of the determined number of instances of output to simulate for the first task, the second task may determine a name for the instance of the simulated output, based on a pattern derived from the naming scheme used by the first task to name its output and/or the method by which the first task has named each of a plurality of historical instances of output by the first task.

For instance, the second task may determine that historical instances of output by the first task all include a date and time that the instance of output was created. In response, the second task may determine a date and time that the instance of the simulated output should have been created by the first task, and may determine the name for the instance of the simulated output, based on the determined date and time. In another example, the second task may determine a pattern where historical instances of output by the first task all include a name of the system where the instance of output was created. In response, the second task may determine and add the name of the system to the name for the instance of the simulated output, according to the pattern.

Also, in one embodiment, for each of the determined number of instances of output to simulate for the first task, the second task may determine a storage location for the instance of the simulated output, based on a pattern derived from the location used by the first task to store its output and/or the location used by the first task to store historical instances of output by the first task. In another embodiment, for each of the determined number of instances of output to simulate for the first task, the second task may determine a size for the instance of the simulated output, based on a pattern derived from one or more size limitations followed by the first task when creating its output and/or an average size of a predetermined number of historical instances of output by the first task.

Additionally, in one embodiment, each instance of the simulated output may include only details including a name, storage location, and size determined for the instance, without having to create the snapshot itself (as done by the first task). For example, each instance of the simulated output may include only metadata (e.g., timestamp, name, storage location, size, etc.) associated with the output of the first task, and not the output itself. For instance, if the output of the first task is a system snapshot, the simulated output may include only metadata (e.g., timestamp, name, storage location, size, etc.) associated with the snapshot, and not the snapshot itself.

In this way, the second task may simulate the output of the first task without disturbing the running of the first task or interrupting a state of the system.

Further, method 400 may proceed with operation 404, where the simulated output is compared to actual output of the first task for the predetermined time period. In one embodiment, the actual output of the first task may be analyzed over the predetermined time period in order to determine details of each instance of the actual output over the predetermined time period. For example, metadata such as a name, storage location, and size may be determined for each instance of the actual output of the first task.

Further still, in one embodiment, a number of instances of the simulated output may be compared to a number of instances of the actual output for the predetermined time period. For example, a number of instances of the simulated output within a predetermined storage location may be compared to a number of instances of the actual output within the predetermined storage location for the predetermined time period.

Also, in one embodiment, the details (e.g., metadata, etc.) of each instance of the simulated output may be compared to the details (e.g., metadata, etc.) of each instance of the actual output for the predetermined time period. For example, a name of each instance of the simulated output may be compared to a name of each instance of the actual output for the predetermined time period. In another example, a size of each instance of the simulated output may be compared to a size of each instance of the actual output for the predetermined time period. In yet another example, a storage location of each instance of the simulated output may be compared to a storage location of each instance of the actual output for the predetermined time period.

In addition, method 400 may proceed with operation 406, where an alert is generated in response to determining that the simulated output does not match the actual output for the predetermined time period. In one embodiment, it may be determined that the simulated output does not match the actual output in response to determining that a number of instances of the simulated output does not equal a number of instances of the actual output for the predetermined time period. In another embodiment, it may be determined that the simulated output does not match the actual output in response to determining that one or more details (e.g., metadata, etc.) of each instance of the simulated output do not match details (e.g., metadata, etc.) of each instance of the actual output for the predetermined time period.

For example, it may be determined that the simulated output does not match the actual output in response to determining that each name of all instances of the simulated output do not have a corresponding name within all instances of the actual output for the predetermined time period. For instance, one or more names may be determined to be different, missing, etc. In another example, it may be determined that the simulated output does not match the actual output in response to determining that a storage location of each instance of the simulated output does not match a storage location of a corresponding instance of the actual output for the predetermined time period. For instance, one or more instances of output may be determined to be at a different location, may be determined to be missing, etc.

In yet another example, it may be determined that the simulated output does not match the actual output in response to determining that a size of each instance of the simulated output does not match a size of a corresponding instance of the actual output for the predetermined time period. A size of each instance of the simulated output may match a size of a corresponding instance of the actual output if the size of the instance of the simulated output is within a predetermined percentage of a size of a corresponding instance of the actual output.

Furthermore, in one embodiment, the alert may include a message to one or more users (e.g., an email, text message, pop-up image, etc.). For example, the alert may list the predetermined time period, and may describe differences between the simulated output and the actual output for the predetermined time period. In another embodiment, the first task and/or the system may be automatically restarted in response to determining that the simulated output does not match the actual output.

Further still, in one embodiment, one or more updates and/or patches may be automatically searched for/applied to the first task in response to determining that the simulated output does not match the actual output. In another embodiment, anti-malware software may be automatically applied to the system and/or updated in response to determining that the simulated output does not match the actual output. In yet another embodiment, a schedule of the first task may be automatically adjusted in response to determining that the simulated output does not match the actual output. For example, in response to determining that one or more instances of the simulated output are missing from the actual output, a schedule of the first task may be adjusted so that the first task runs more frequently. In this way, the first task may be run with an increased frequency in order to compensate for missing output from the first task.

In this way, the second task may monitor the first task to ensure that the first task is running and producing output as intended. If the second task determines that the first task is not running as intended, the second task may notify one or more users and may dynamically perform one or more actions to correct the first task.

Figure 5:
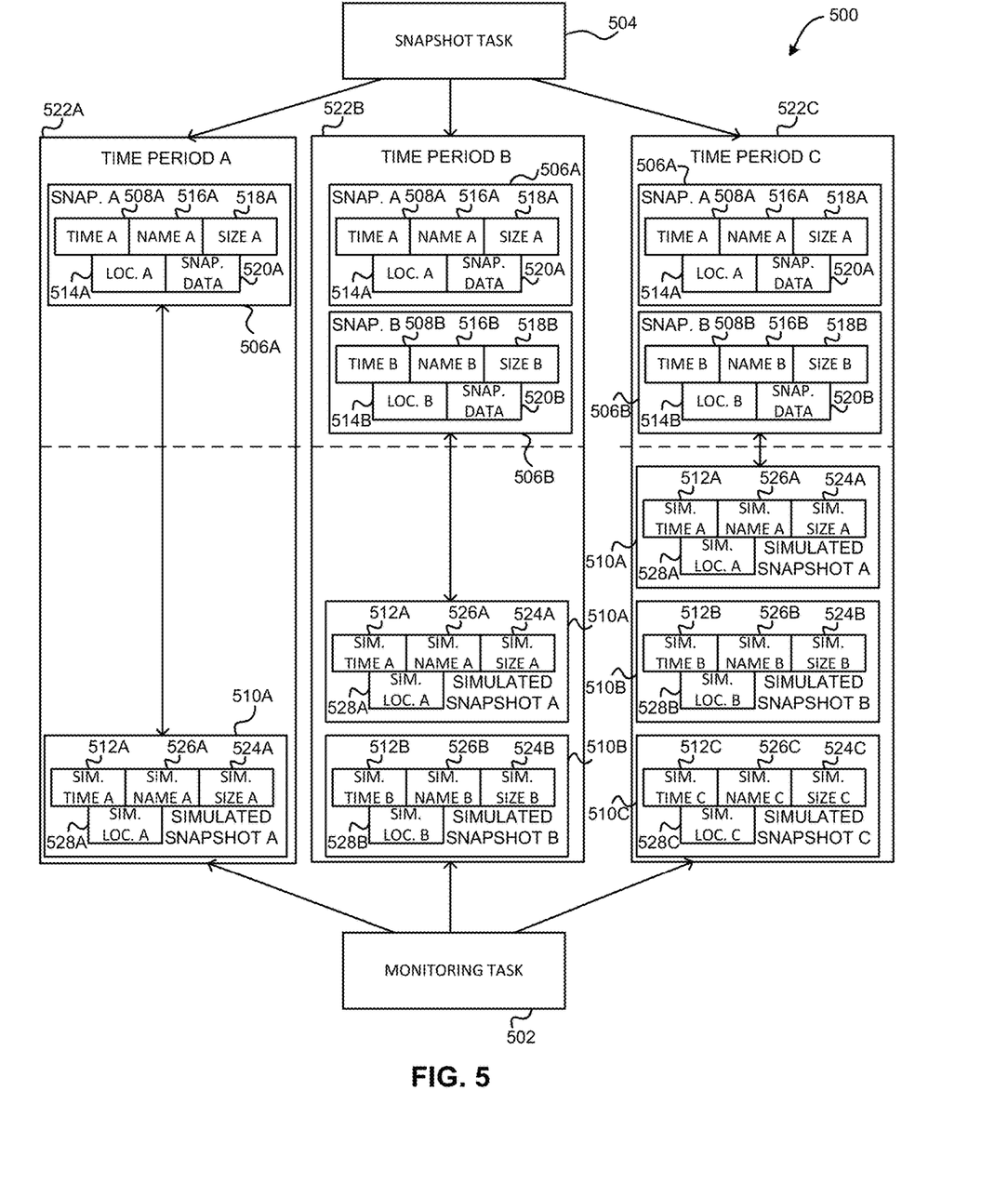
FIG. 5 illustrates an exemplary implementation of a monitoring task, in accordance with one embodiment.

FIG. 5 illustrates an exemplary implementation 500 of a monitoring task 502, according to one exemplary embodiment. As shown, a snapshot task 504 running within a system creates a first snapshot 506A according to a predetermined schedule with a first name 516A and a first size 518A at a first creation time 508A and stores the first snapshot 506A at a first storage location 514A. The first name 516A, first size 518A, first creation time 508A, and first storage location 514A are stored as metadata within the first snapshot 506A along with the first snapshot data 520A created by the snapshot task 504.

Further, in one embodiment, the monitoring task 502 may request information from the snapshot task 504, such as a naming scheme for the snapshot task 504, the storage location where the snapshot task 504 stores snapshots, one or more size limitations followed by the snapshot task 504 when creating snapshots, a schedule by which the snapshot task 504 creates snapshots, etc. In another embodiment, the monitoring task 502 may also identify and analyze historical snapshots created by the snapshot task 504 (e.g., snapshots created by the snapshot task 504 prior to the first snapshot 506A, etc.) in order to determine details (e.g., metadata, etc.) of the snapshots.

Further still, the monitoring task 502 may create a first simulated snapshot 510A for a first time period 522A, based on the information requested from the snapshot task 504 and/or patterns derived from details of the snapshots obtained by analyzing historical snapshots created by the snapshot task 504. The first simulated snapshot 510A does not include snapshot data, and includes metadata such as a first simulated creation time 512A, a first simulated size 524A, a first simulated name 526A, and a first simulated storage location 528A.

Also, after creating the first simulated snapshot 510A, the monitoring task 502 may compare details of all simulated snapshots created during the first time period 522A to details of all snapshots created during the first time period 522A. For example, the monitoring task 502 may compare details of the first simulated snapshot 510A (e.g., metadata including the first simulated name 526A, the first simulated size 524A, the first simulated creation time 512A, and the first simulated storage location 528A) to details of the first snapshot 506A (e.g., metadata including the first name 516A, first size 518A, first creation time 508A, and first storage location 514A).

Upon determining that the details of all simulated snapshots created during the first time period 522A match (or are within a predetermined range of) details of all snapshots created during the first time period 522A, the monitoring task 502 may confirm that the snapshot task 504 is operating correctly for the first time period 522A.

Additionally, at time after the first time period 522A, the snapshot task 504 creates a second snapshot 506B according to the predetermined schedule with a second name 516B and a second size 518B at a second creation time 508B and stores the second snapshot 506B at a second storage location 514B. The second name 516B, second size 518B, second creation time 508B, and second storage location 514B are stored as metadata within the second snapshot 506B along with the second snapshot data 520B created by the snapshot task 504.

Further still, the monitoring task 502 may create a second simulated snapshot 510B for a second time period 522B, based on the information requested from the snapshot task 504 and/or patterns derived from details of the snapshots obtained by analyzing historical snapshots created by the snapshot task 504. The second simulated snapshot 510B does not include snapshot data, and includes metadata such as a second simulated creation time 512B, a second simulated size 524B, a second simulated name 526B, and a second simulated storage location 528B.

Also, after creating the second simulated snapshot 510B, the monitoring task 502 may compare details of all simulated snapshots created during the second time period 522B to details of all snapshots created during the second time period 522B. For example, the monitoring task 502 may compare details of the first simulated snapshot 510A (e.g., metadata including the first simulated name 526A, the first simulated size 524A, the first simulated creation time 512A, and the first simulated storage location 528A) to details of the first snapshot 506A (e.g., metadata including the first name 516A, first size 518A, first creation time 508A, and first storage location 514A). Additionally, the monitoring task 502 may compare details of the second simulated snapshot 510B (e.g., metadata including the second simulated name 526B, the second simulated size 524B, the second simulated creation time 512B, and the second simulated storage location 528B) to details of the second snapshot 506B (e.g., metadata including the second name 516B, second size 518B, second creation time 508B, and second storage location 514B).

Upon determining that the details of all simulated snapshots created during the first time period 522A match (or are within a predetermined range of) details of all snapshots created during the first time period 522A, the monitoring task 502 may confirm that the snapshot task 504 is operating correctly for the second time period 522B.

Additionally, at time after the second time period 522B, due to a failure of the snapshot task 504 (or unintentional and/or malicious activity within the system), the snapshot task 504 fails to create a snapshot according to the predetermined schedule at a third time. As a result, during a third time period 522C, only the first snapshot 506A and the second snapshot 506B have been created by the snapshot task 504.

Further still, the monitoring task 502 may create a third simulated snapshot 510C for the third time period 522C, based on the information requested from the snapshot task 504 and/or patterns derived from details of the snapshots obtained by analyzing historical snapshots created by the snapshot task 504. The third simulated snapshot 510C does not include snapshot data, and includes metadata such as a third simulated creation time 512C, a third simulated size 524C, a third simulated name 526C, and a third simulated storage location 528C.

Also, after creating the third simulated snapshot 510C, the monitoring task 502 may compare details of all simulated snapshots created during the third time period 522C to details of all snapshots created during the third time period 522C. For example, the monitoring task 502 may compare details of the first simulated snapshot 510A (e.g., metadata including the first simulated name 526A, the first simulated size 524A, the first simulated creation time 512A, and the first simulated storage location 528A) to details of the first snapshot 506A (e.g., metadata including the first name 516A, first size 518A, first creation time 508A, and first storage location 514A).

Additionally, the monitoring task 502 may compare details of the second simulated snapshot 510B (e.g., metadata including the second simulated name 526B, the second simulated size 524B, the second simulated creation time 512B, and the second simulated storage location 528B) to details of the second snapshot 506B (e.g., metadata including the second name 516B, second size 518B, second creation time 508B, and second storage location 514B).

However, during the comparison, the monitoring task 502 may determine that a third snapshot having details matching the third simulated snapshot 510C does not exist for the third time period 522C. In response to this determination, the monitoring task 502 may send an alert that includes details of the third simulated snapshot 510C. In response to this determination, the monitoring task 502 may also patch the snapshot task 504, update anti-malware software within the system, restart the snapshot task 504, re-schedule the snapshot task 504, etc.

In this way, the monitoring task 502 may detect issues with the snapshot task 504 and dynamically report/fix those issues.

Periodic Task Integrity Analyzer

Periodic tasks exist within a system that may occasionally perform an operation within the system. As with any other task, these periodic tasks may fail for numerous reasons, which may cause irregularities future operations by the tasks. A user may not know what failed or what should be a final (current) state of the task.

In response, the state of the job may be calculated as it should be if it ran without any interruptions or failure, where the state of the job may be of a type that is possible to check without running a job and changing a state of a machine (for instance, checking that objects that should be created by a task are in fact created).

In one embodiment, an image may be simulated (without disturbing a run of a task), where the image includes details of what should be a state (example, all the objects that should be created by the task) at a predetermined time if there were no interruptions and the task ran successfully.

A mechanism may run periodically and may calculate for each periodic task when it should have run. The task may be periodic or progressive so the run times may be calculated based on a predetermined schedule for the task. The mechanism may also create an image of the correct state in which a machine should currently be in (e.g., by running a "what if" mechanism, etc.).

The simulation may be done by running a mock task which may show the result of the original calculations. For example, a snapshot scheduler creates a snapshot in a volume in a periodic matter (every hour for example). In one embodiment, after a few runs, the machine was down for a certain time period and the snapshot scheduler failed to create snapshots for that time period.

After the machine was brought back up after its downtime, a "what if" mechanism may start. The "what if" mechanism may also run periodically, but may run according to a different schedule than the snapshot scheduler. Based on data retrieved from the snapshot scheduler, the "what if" mechanism may know when the snapshot scheduler should have run, and may simulate the snapshots created on the machine by creating an image with the snapshot names that should have been created. These simulated snapshots may be compared to snapshots currently created by the snapshot scheduler. If the "what if" mechanism finds that there are missing snapshots, it may send a message (e.g., an alert) to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
simulating, for a predetermined time period, output of a first task that periodically runs within a system to create a simulated output;
comparing the simulated output to actual output of the first task for the predetermined time period; and
generating an alert in response to determining that metadata of each instance of the simulated output does not match metadata of each instance of the actual output of the first task for the predetermined time period.

2. The computer-implemented method of claim 1, wherein the output is simulated by a second task separate from the first task that runs according to a second schedule different from a first schedule of the first task.

3. The computer-implemented method of claim 1, further comprising analyzing the first task in order to determine one or more details of the output of the first task.

4. The computer-implemented method of claim 1, further comprising querying the first task to obtain one or more parameters of the first task, the one or more parameters including a naming scheme used by the first task to name its output, a location used by the first task to store its output, one or more size limitations followed by the first task when creating its output, and a schedule by which the first task creates instances of output.

5. The computer-implemented method of claim 1, further comprising analyzing historical output of the first task in order to determine one or more details of the historical output of the first task, where the one or more details of the historical output of the first task include:
   a naming scheme used by the first task to name the output of the first task, including a method by which the first task has named each of a plurality of historical instances of output by the first task,
   a storage location used by the first task to store the output of the first task, including a location used by the first task to store historical instances of output by the first task,
   a size of the historical output of the first task, including an average size of a predetermined number of historical instances of output by the first task.

6. The computer-implemented method of claim 1, further comprising simulating the output of the first task for the predetermined time period, based on one or more determined details of historical output of the first task.

7. The computer-implemented method of claim 1, further comprising:
   determining a number of instances of output to simulate for the first task, based on a schedule by which the first task creates instances of output;
   determining a specific date and time that each instance of output should be created by the first task during the predetermined time period, based on the schedule; and
   for each of the instances of output to simulate for the first task:
      determining a timestamp for the instance of the simulated output, based on a schedule by which the first task creates instances of output,
      determining a name for the instance of the simulated output, based on a method by which the first task has named each of a plurality of historical instances of output by the first task,
      determining a storage location for the instance of the simulated output, based on a location used by the first task to store historical instances of output by the first task, and
      determining a size for the instance of the simulated output, based on an average size of a predetermined number of historical instances of output by the first task.

8. The computer-implemented method of claim 1, wherein the output of the first task is a system snapshot, and the simulated output includes only the metadata associated with the system snapshot, and not the system snapshot itself.

9. The computer-implemented method of claim 1, further comprising comparing a number of instances of the simulated output to a number of instances of the actual output within a predetermined storage location for the predetermined time period.

10. The computer-implemented method of claim 1, wherein it is determined that the simulated output does not match the actual output in response to determining that a number of instances of the simulated output does not equal a number of instances of the actual output for the predetermined time period.

11. The computer-implemented method of claim 1, wherein it is determined that the simulated output does not match the actual output in response to determining that:
   each name of all instances of the simulated output do not have a corresponding name within all instances of the actual output for the predetermined time period,
   a storage location of each instance of the simulated output does not match a storage location of a corresponding instance of the actual output for the predetermined time period, or
   a size of each instance of the simulated output does not match a size of a corresponding instance of the actual output for the predetermined time period.

12. The computer-implemented method of claim 1, wherein the alert lists the predetermined time period, and describes differences between the simulated output and the actual output for the predetermined time period.

13. The computer-implemented method of claim 1, further comprising automatically restarting the first task in response to determining that the simulated output does not match the actual output.

14. The computer-implemented method of claim 1, further comprising automatically searching for and applying one or more updates to the first task in response to determining that the simulated output does not match the actual output.

15. The computer-implemented method of claim 1, further comprising automatically updating anti-malware software within the system in response to determining that the simulated output does not match the actual output.

16. The computer-implemented method of claim 1, further comprising automatically adjusting a schedule of the first task in response to determining that the simulated output does not match the actual output.

17. A computer program product for monitoring task output within a system, the computer program product comprising a computer readable storage medium having program instructions embodied therewith, the program instructions executable by a processor to cause the processor to perform a method comprising:
   simulating, for a predetermined time period, output of a first task that periodically runs within a system to create a simulated output, utilizing the processor;
   comparing, utilizing the processor, the simulated output to actual output of the first task for the predetermined time period; and
   generating an alert in response to determining that metadata of each instance of the simulated output does not match metadata of each instance of the actual output of the first task for the predetermined time period, utilizing the processor.

18. A system, comprising:
   a processor; and
   logic integrated with the processor, executable by the processor, or integrated with and executable by the processor, the logic being configured to:

simulate, for a predetermined time period, output of a first task that periodically runs within a system to create a simulated output;
compare the simulated output to actual output of the first task for the predetermined time period;
generate an alert in response to determining that the simulated output does not match the actual output for the predetermined time period; and
automatically adjusting a schedule of the first task in response to determining that the simulated output does not match the actual output.

\* \* \* \* \*